2,933,348
WHEEL COVER
George Albert Lyon, Detroit, Mich.
Application December 14, 1956, Serial No. 628,290
4 Claims. (Cl. 301—37)

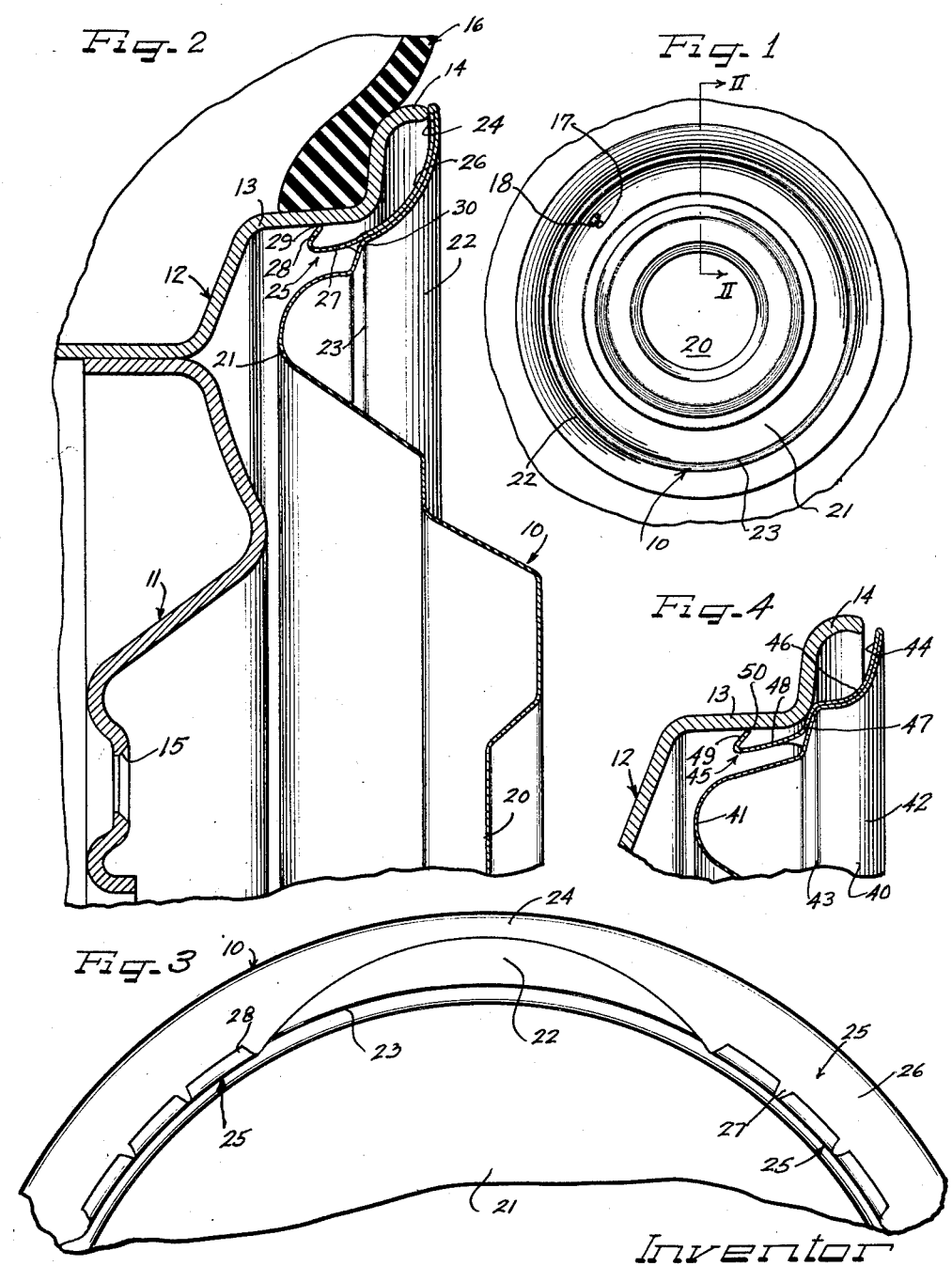
Inventor
GEORGE ALBERT LYON de States Patent Office 2,933,348
Patented Apr. 19, 1960

This invention relates generally to wheel structures and more particularly to an ornamental wheel cover member for overlying protective retained disposition upon the outer side of a vehicle wheel.

An important object of this invention is to provide a new and improved wheel cover construction having new and improved means for maintaining the cover member in detachable interlocked assembly upon a vehicle wheel.

Another object of this invention is to provide a wheel cover which may be pressed to shape eliminating trimming of the blank with the exception of the finger terminals.

Still another object of this invention is to provide a new and improved wheel cover member which lends itself to economical manufacture on a large production basis since the cover may be made from a blank substantially reduced in size.

According to the general features of this invention there is provided in a wheel structure, including rim and body parts and including an intermediate rim flange terminating in on outer terminal margin, a dished cover section for overlying retained disposition upon the wheel with an outer margin extending outwardly for overlying the terminal margin, an annular shoulder at the inner periphery of the margin, the cover margin being underturned providing a substantially reduced generally radial annular cover portion, and radially and axially elongated circumferentially spaced resiliently deflectable retaining extensions emanating from the reduced cover portion and having an intermediate portion bottomed against said shoulder, the extension having resiliently deflectable terminal portions fulcrumed on the shoulder to augment the resiliency of the terminal and for detachable retaining engagement with the intermediate rim flange.

Other objects and features of the present invention will more fully become apparent in view of the following detailed description taken in conjunction with the accompanying drawings illustrating therein several embodiments and in which:

Figure 1 is a side elevation of my wheel structure;

Figure 2 is an enlarged fragmentary cross-sectional view taken substantially on the line II—II of Figure 1 looking in the direction indicated by the arrow;

Figure 3 is an enlarged fragmentary rear elevation of my wheel cover; and

Figure 4 is a fragmentary cross-sectional view similar to Figure 2 only illustrating a modified wheel cover construction.

A wheel cover 10 according to the present invention is constructed and arranged to be applied in press-on, pry-off relation to the outer side of the vehicle wheel which may be of the conventional type having a disk spider wheel body 11 carrying a multi-flange drop center tire rim 12 whlch rim has a generally radially outwardly extending intermediate flange 13 terminating in an outer rim margin including an axially extending terminal rim flange 14.

The body part 11 is adapted to be bolted onto the axle of a vehicle wheel in a conventional manner, such as by directing lugs through wheel openings 15 in the body part and thereafter threading nuts onto the lugs to clamp the body part to the axle.

The tire rim is adapted to support a pneumatic tire and tube assembly, or a tubeless tire 16 as is shown in Figure 2. For inflating the tire, the tire is provided with a valve stem 17 which extends through cover opening 18 as is shown in Figure 1 so as to be accessible from the outer side of the wheel.

The wheel cover 10 comprises a one piece sheet metal stamped and drawn circular body having a central crown portion 20 for overlying a central portion of the wheel body 11 and merging with an intermediate annular inwardly dished portion 21 comprising an axially inwardly extending part from which extends generally radially and axially outwardly an outwardly bulged convexly curved outer annular marginal portion or radially outer marginal part 22 for overlying the tire rim 12. At the junction of the portions 21 and 22 is provided an axially inwardly indented reinforcing rib or insetting portion 23 which is disposed generally opposite the retaining means.

The outer margin 22 is underturned to provide a continuous annular generally axially outwardly bulged convexly curved annular portion 24. The annular portion 24 is nestingly engaged against the inner face of the cover margin 22 and is radially reduced in dimension (Figure 3). It will be appreciated that by reducing the dimension of the annular flange portion 24 a smaller blank size may be used thus reducing manufacturing costs. Also, since no trimming of the flange portion 24 is required production costs may be further substantially reduced.

New and improved means are provided for press-on, pry-off retention of the cover on the wheel. To this end, the underturned outer marginal portion 24 has integrally formed therewith resiliently deflectable circumferentially spaced retaining extensions 25. The portion 24 and the extensions 25 comprise a generally ring-shaped portion carried by the annular cover portion or cover 10. The extension 25 has a rigid generally radially extending curved portion 26 which is convexedly curved and nestingly engages against the inner face of the curved margin 22 with the portion 26 being rigid until it extends free of the cover at the annular rib 23. Connected to the radially inner end of the extension portion 26 is a generally radially and axially inwardly elongated resiliently deflectable portion 27. The portion 27 is curved so that it smoothly blends with the curvature of the portion 26. The portion 26 and the elongated deflectable portion 27 are disposed in concentric arcs having the same midpoint. Disposed at the axially inner end of the flange portion 27 are a series of return bent short stiff terminals 28 separated by notches and which terminals have edges 29 which are adapted to engage in edgewise relation with the intermediate rim flange 13 on the tire rim 12.

To augment the resiliency of the retaining means, the flange portions 27 are bottomed at 30 against the annular rib 23.

The cover may be assembled with respect to the wheel by initially aligning the valve stem 17 with respect to the cover opening 18, then upon the application of an axially inward force, the short stiff terminals 28 may be caused to be biased as they are cammed along the intermediate rim flange 13 with the intermediate flange portion 27 fulcrumed at 30 against the rib 23 until the cover 10 is in retaining engagement on the wheel.

Any suitable number of retaining extensions 25 may be provided although it will be appreciated four of the extensions will be adequate and they may be formed from the corners of the blank from which the cover is formed.

When the cover is in assembly upon the wheel the underturned annular portion 24 is bottomed against the terminal rim flange 14 so as to provide a positive abutment so that if impact forces developed in curbing and the like are directed against the outer margin of the cover the retaining means will not be readily dislodged nor distorted with respect to the tire rim.

The cover may be removed from the wheel by inserting between the cover and the tire rim a pry-off tool and upon exerting a pry-off force the cover may be ejected from the wheel.

The reference numeral 40 indicates generally the modified cover shown in Figure 4. The cover 40 is very similar to the cover 10 and includes a dished annular cover portion 41 comprising an axially inwardly extending part which is connected at its radially outer periphery to a convexly curved cover margin or radially outer marginal part 42. At the junction of the cover portion 41 with the margin 42 is provided an annular radially and axially inwardly indented annular rib or insetting portion 43.

The cover margin 42 is underturned to form a continuous annular underturned marginal portion 44 which is reduced in radial dimension the same as the corresponding portion 24 in the first form of my invention.

Disposed at the radially inner end of the underturned portion 44 are provided circumferentially spaced retaining extensions 45. The portion 44 and the extensions 45 comprise a generally ring-shaped portion carried by the annular cover portion or cover 40. Each of the retaining extensions 45 includes a dished convexly curved retaining portion 46 which is in nested abutting engagement against the inner face of the cover margin 42 with the rigidity in the retaining extensions extending out generally to the rib 43. Generally at the rib 43, the retaining extension 45 is stepped radially inwardly through the provision of a radially extending portion 47. Connected at the radially and axially inner end of the portion 47 is an intermediate resiliently deflectable elongated flange portion 48 which flange portion terminates in a series of return bent terminals 49 in much the same manner as shown in Figure 3. The terminals 49 each terminate in edges 50 for edgewise biting engagement with the rim flange 13. As the cover 40 is assembled with the wheel, the edges 50 are progressively deflected along the inner face of the rim flange 13 until the junction of the retaining portions 46 and 47 is bottomed against the tire rim. It will be appreciated the resiliently deflectable portion 48 is fulcrumed on the rib 43 thereby stiffening the portion 48 and augmenting the resilient deflectability of the retaining extension 45.

It will be appreciated the cover 40 may be assembled and removed from the vehicle wheel in much the same manner as in the case of the cover 10. The cover 40 differs from the cover 10 in that the rib 43 is positioned further radially and axially outwardly than the rib 23. Also, the retaining extensions 45 are stepped to permit the extension portions 48 and 49 to extend sufficiently radially inwardly so as to be capable of gripping biting engagement with the rim flange 13.

In both cases, the retaining extensions extend almost out to the outer tip of the respective cover margins 22 and 42 with the annular underturned flange area being substantially reduced to reduce cost. In both cases to augment the resilient deflectability of the retaining extensions the extensions are intermediately bottomed against a rib on the cover.

It will be understood that modifications and variations may be effected without departing from the spirit and scope of the novel concepts of the present invention.

I claim as my invention:

1. In a cover for disposition at the outer side of a vehicle wheel including a wheel body and a tire rim having a radially inwardly facing annular flange, an annular cover portion for overlying the tire rim and having a radially outer marginal part thereof extending generally radially inwardly for overlying the rim flange and an axially inwardly extending part for disposition in generally telescoped radially inwardly spaced relation to the rim flange, said annular cover portion having intermediately thereof and adjacent juncture of the axially and radially extending parts thereof an insetting portion by which at least the major extent of said axially extending part is inset substantially relative to the contiguous portion of the radially extending part, and a cover retaining structure carried by said annular cover portion and comprising a generally ring shaped portion disposed in nested relation behind said radially extending part and with cover retaining resilient fingers extending generally axially inwardly opposite said inset portion and projecting beyond said insetting portion, said inset portion thereby remaining spaced radially inwardly from the fingers and enabling radial flexure of the fingers upon engagement of retaining terminals on the fingers with the rim flange, said radially inward flexure being substantially resiliently stiffened by the backing up of the ring portion against the cover portion to the point where the fingers project axially inwardly beyond said insetting portion, the annular cover portion and the cover retaining structure comprising a one-piece cover, the one-piece cover having an annular axially inwardly dished portion and with said axially inwardly extending part comprising a portion of said annular axially inwardly dished portion.

2. The cover of claim 1 further characterized by the juncture of the insetting portion and the radial part providing a cover shoulder which shoulder is disposed radially and axially outwardly of the intermediate rim flange for bottomed engagement with the tire rim, the fingers each including a radial portion disposed radially inwardly of the cover shoulder and with the radial portion of the finger being backed up by the insetting portion.

3. The cover of claim 1 further characterized by the tire rim including a terminal rim flange and by the annular cover portion being underturned at its radially outer margin and with the cover retaining structure comprising an integral underturned extension of the annular cover portion, the underside of the annular cover portion being bottomed against the terminal rim flange axially outwardly of the radially facing flange on the tire rim.

4. In a wheel structure including rim and body parts and including an intermediate rim flange terminating in an outer terminal margin, a one-piece wheel cover for overlying retained disposition upon the wheel, said cover having an annular dished area and an outer margin extending outwardly for overlying the terminal margin, the annular dished area and the outer margin being joined by an insetting cover portion, an annular radially facing cover shoulder at the inner periphery of the margin defined by the juncture of the margin with the insetting cover portion, said cover margin being underturned providing a substantially reduced generally radial annular cover portion disposed radially and axially outwardly of said annular radially facing cover shoulder, and radially and axially elongated circumferentially spaced resiliently deflectable retaining extensions emanating from said reduced cover portion and said extensions including gripping edges for biting cooperation with the rim flange axially inwardly and radially outwardly of said annular radially facing cover shoulder, said extensions having an intermediate portion bottomed against said annular radially facing cover shoulder, said extensions having resiliently deflectable terminal portions spaced from the cover having its axially outer end fulcrumed on said annular radially facing cover shoulder in close proximity to said gripping edges to augment the resiliency of the terminal portions and for detachable retaining engagement with the intermediate rim flange.

References Cited in the file of this patent

UNITED STATES PATENTS

| | | |
|---|---|---|
| 2,279,333 | Lyon | Apr. 14, 1942 |
| 2,544,705 | Lyon | Mar. 13, 1951 |
| 2,674,495 | Lyon | Apr. 6, 1954 |